United States Patent [19]
Bruenner

[11] 3,819,561
[45] June 25, 1974

[54] WETTING AGENTS FOR NON-AQUEOUS DISPERSIONS

[75] Inventor: Rolf S. Bruenner, Orangevale, Calif.

[73] Assignee: Aerojet-General Corporation, El Monte, Calif.

[22] Filed: Oct. 23, 1970

[21] Appl. No.: 83,473

[52] U.S. Cl......... 260/326 A, 260/32.6 R, 252/171, 252/546
[51] Int. Cl. ........................ C08f 45/44, C08g 51/44
[58] Field of Search..... 260/33.6 A, 32.6 N, 32.6 A, 260/29.1; 252/171, 546

[56] References Cited
UNITED STATES PATENTS
2,993,044  7/1961  Applegath et al. ............. 260/247.2
3,184,301  2/1965  Martin .................................. 71/2.6

*Primary Examiner*—Morris Liebman
*Assistant Examiner*—Richard Zaitlen
*Attorney, Agent, or Firm*—E. O. Ansell; M. C. Jacobs

[57] ABSTRACT

This patent comprises novel non-aqueous dispersions of polar solids in non-polar organic liquids containing a wetting agent which is:

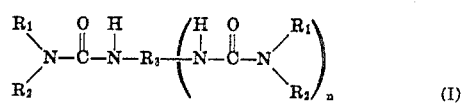

wherein $R_1$ and $R_2$ are monovalent organic groups such as alkyl or aryl, $R_3$ is an aliphatic or aromatic hydrocarbon structure to which the ureido groups are attached, and $n$ is an integer of from 1 to about 4;

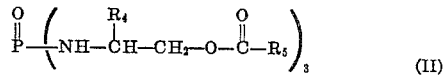

wherein $R_4$ is hydrogen or monovalent organic, usually lower alkyl, and $R_5$ is monovalent organic such as alkyl or phenyl;

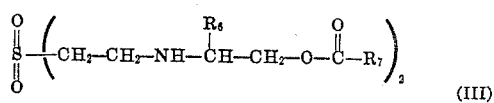

wherein $R_6$ is hydrogen or lower alkyl and $R_7$ is a monovalent organic group such as alkyl, phenyl or aryl;

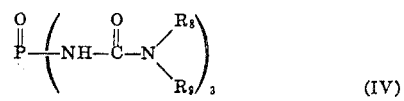

wherein $R_8$ and $R_9$ are monovalent organic groups such as alkyl or aryl.

2 Claims, 11 Drawing Figures

WETTING AGENTS FOR NON-AQUEOUS DISPERSIONS

BACKGROUND OF THE INVENTION

Wetting agents are used to reduce the viscosity of suspensions, disperse particles and break-up agglomerates, stabilize very small particles to prevent regrowth, and improve the grinding of solids to collodial dimensions.

Wetting agents reduce the strong forces between highly polar particles suspended in an unpolar liquid, which are responsible for the high viscosity and thioxtropy of such suspensions. They attach themselves to the solid with the polar part of the wetting agent molecule, the unpolar hydrocarbon part forming the outer surface of the adsorbed o with one mole of an organic polyisocyanate of the formula:

NCO—R₃— (NCO)ₙ.

The wetting agents of formula II are prepared by reacting a mole of the compound of the formula:

with three moles of an organic monocarboxylic acid of the formula:

$R_5-C-OH$.

The wetting agents of formula III are made by reacting one mole of a sulfone of the formula:

with two moles of a monocarboxylic acid of the formula:

$R_7-C-OH$.

The wetting agents of formula IV are prepared by reacting m moles of a secondary amine of the formula:

with one mole of a polyisocyanate of the formula:

To demonstrate wetting agents it was found most convenient to measure the viscosity of suspensions, e.g. ultrafine ammonium perchlorate (UFAP) in mineral oil (liquid petrolatum), which combines a suitable viscosity with inertness and low volatility, and comes close to a hydrocarbon (hydroxy-terminated polybutadiene) binder. The mixture used consisted of 625g BDB coated UFAP (0.5µ) in 1 ltr. mineral oil. Its consistency is like vaseline and it does not settle nor flow without vibration, but with wetting agents it will, and viscosities as low as 1,500 centistokes can be obtained, which allow quantitative measurements in Oswald type viscosimeters.

For measurement purposes, 4 grams of above suspension were mixed with 40 mg (1%) of the wetting agent to be tested. Changes in fluidity were judged only qualitatively by the flow behavior. Only those wetting agents, which made the suspension flow without vibration were subjected to quantitative viscosity measurements. Table I summarizes the results thus obtained with a variety of wetting agents. For each class of compounds a typical example is given, usually one that produces the strongest effect within that class as to lowering viscosity (called "Optimal Effect" in Table I). A "very weak" effect means that the mixture becomes less thioxtropic, but still does not flow without vibration, whereas a "weak" effect means that flow occurs without vibration, (i.e. the "static" yield value is zero), but the viscosity is still high.

TABLE I.—TYPES OF WETTING AGENTS AND THEIR EFFECTS ON UFAP SLURRIES IN A HYDROCARBON OIL

| Class of compounds | Examples | Optimal effect |
| --- | --- | --- |
| Cationic wetting agents: | | |
|   Substituted ammonium salts | [H₃₇C₁₈—N(CH₃)₂—CH₂—⟨⟩]Cl | Very weak. |
|   Fatty amines | H₃₃C₁₆—N(CH₃)₂ | Weak. |
| Anionic wetting agents: | | |
|   Alkane sulfonates | Twitchell's base 8240 | Medium. |
|   Fatty acids and their salts | Oleic acid | Weak. |
| Zwitterionic wetting agents: | | |
|   Amine oxides | H₃₇C₁₈—N(CH₂CH₂OH)₂ (O) | None. |
|   Betaines | H₂₅C₁₂—N⁺(CH₃)₂—CH₂—CH₂-COO⁻ | Do. |
|   Sulfobetaines | H₃₇C₁₈—N⁺(CH₃)₂—(CH₂)₃—SO₃⁻ | Do. |
|   Phosphobetaines | Lecithin | Strong. |
| Nonionic wetting agents: | | |
|   Fatty nitriles | n-Undecyl-cyanide | None. |
|   Fatty alcohols | Oleylalcohol | Do. |
|   Fatty esters | Sorbitantrioleate | Weak. |
|   Polyethers | Polyethylene glycol di-oleate | Medium. |
| Amide type: | | |
|   Carboxylic acid amides | Oleoyl-N(CH₂CH₂OH)₂ | Do. |
|   Carboxylic acid amide-esters | R-⟨⟩-R, R=—CO—N—CH(C₂H₅)—CH₂—O—oleoyl | Do. |
|   Urethanes | CH₃-⟨⟩-R, R=—NH—CO—O—oleyl | Weak. |

Table I—Continued

| Class of compounds | Examples | Optimal effect |
|---|---|---|
| Ureas: | | |
| Mono-ureas | $H_9C_4-NH-CO-N(C_{18}H_{37})_2$ | Do. |
| Bis-ureas | $H_2C\left[\text{—◯—}NH-CO-N(oleyl)_2\right]$ | Very strong. |
| Tris-ureas | R—◯(R)(R), $R=-NH-CO-N(oleyl)_2$ | Do. |
| Bis-urea-esters | $O_2N-N[-CH_2-CH_2-NH-CO-NH-\overset{CH_3}{\underset{|}{C}H}-CH_2-O-oleoyl]_2$ | Strong. |
| Thioureas | $S=C[-N(oleyl)_2]_2$ | Very weak. |
| Phosphonitrilamides | $[PN(NH-C_{18}H_{33})_2]_3$ | None. |
| Phosphoamides | $OP(N\underset{C_{18}H_{37}}{\overset{CH_3}{\diagup\diagdown}})_3$ | Do. |
| Phosphoamide-esters | $OP[-NH-\overset{CH_3}{\underset{|}{C}H}-CH_2-O-oleoyl]_3$ | Strong. |
| Phosphoureides | $OP[-NH-CO-N(oleyl)_2]_3$ | Very strong. |
| Silicoureides | $Si[-NH-CO-N(oleyl)_2]_4$ | Strong. |
| Aminoestersulfones | $O_2S[-CH_2CH_2-NH-CH_2CH_2-O-oleoyl]_2$ | Do. |

Very few of the ionic types are effective, notably Twitchell's Base 8240, an alkane sulfonate, and lecithin, a phosphobetaine. It may be that this lack of effectiveness is due to insolubility in the dispersion medium, since the effective ones (Twitchell Base and lecithin) are quite soluble in mineral oil. However, solubility is usually good for the nonionic wetting agents, but yet there are large differences in effectiveness, which can be ascribed to specific chemical structures. It is quite striking that all of the strong wetting agents belong to the amide type; even lecithin may be counted as a member of this group, though its amide nitrogen carries a full positive charge. Still other requirements apparently have to be fulfilled for an amide to be a good wetting agent, since some classes of amides are completely ineffective.

Comparing compounds containing only one urea group ("mono-ureas") with those containing two or more urea groups ("bis-urea" etc.) it can be seen that the first ones are hardly effective, whereas among the latter the strongest wetting agents are found. It seems then that for strong adsorption at least two polar groups are necessary. Similar comments apply to the case of simple phosphoamides vs. phosphoamide-esters, where only the latter are good wetting agents.

Within the class of bis-ureas a somewhat more detailed study has been made on the influence of certain substituents on the performance of such compounds as wetting agents. The general formula for these bis-ureas can be written as:

If $R_1 = R_2 = C_{12}H_{25}$ was kept constant, a variation of $R_3$ indicates a slight change in activity. Much more dramatic changes are observed, when $R_3$ is kept constant and $R_1$ and $R_2$ are varied.

Three series of compounds have been synthesized with respectively. $R_1$ was equal to $R_2$ and varied from $C_{18}H_{37}$ through $C_{12}H_{25}$, $C_{10}H_{21}$, $C_8H_{17}$ to $C_6H_{13}$. With $C_{12}H_{25}$ there is still optimal efficiency, but it is falling off rapidly with decreasing hydrocarbon chain length and is practically zero for $C_6H_{13}$. With $R_3 = -CH_{2\,6}-$, $R_1 = CH_3$ and $R_2 = C_{18}H_{37}$, and $C_4H_9$ respectively no activity was found with these compounds. The same was true for $R_3 = -CH_{2\,6}-$, $R_1 = H$ and $R_2 = C_{12}H_{25}$, $C_{16}H_{33}$ and $C_{18}H_{37}$. Superior wetting agents were obtained when $R_1 = R_2 = -(CH_2)_8CH=CH-(CH_2)_7-CH_3$ for the above mentioned class.

A number of wetting agents were subjected to quantitative viscosity measurements. They were added to a suspension of ultrafine ammonium perchlorate in mineral oil at a concentration of 0.5 percent and, after degassing, the viscosity of this mixture was measured at 25°C in an Oswald type viscometer. The results of such measurements are shown in Table II.

TABLE II.—VISCOSITIES OF AN UFAP (BDB-COATED)-MINERAL OIL SLURRY WITH 0.5% ADDITIVE

| No. | Compound | Viscosity (centistokes) |
|---|---|---|
| 1 | $CH_2[-\phenyl-NHCON(oleyl)_2]_2$ [1] | 1,510 |
| 2 | $OP[NHCON(oleyl)_2]_3$ | 1,520 |
| 3 | $O_2N-N[-CH_2-CH_2-NHCON(oleyl)_2]_2$ | 1,581 |
| 4 | R—(phenyl, with CH$_3$)—R; R = —NHCON(oleyl)$_2$ | 1,595 |
| 5 | $CH_2[-\text{(cyclohexyl, H)}-NHCON(oleyl)_2]_2$ | 1,620 |
| 6 | $R-CH_2-\overset{CH_3}{\underset{|}{CH}}-CH_2-C(CH_3)_2-CH_2-CH_2-R$; R = —NHCON($C_{18}H_{37}$)$_2$ | 1,640 |
| 7 | $[-(CH_2)_3-NHCON(oleyl)_2]_2$ | 1,640 |
| 8 | $[-\phenyl-CH_3]_2$; R = —NHCON(oleyl)$_2$ | 1,720 |
| 9 | R—(cyclohexyl, H)—R, R; R = —NHCON($C_{18}H_{37}$)$_2$ | 1,732 |
| 10 | R—(cyclohexyl, H)—R, R; R = —NHCON(oleyl)$_2$ | 1,745 |
| 11 | Pure lecithin | 1,780 |
| 12 | $[-(CH_2)_2-NHCON(C_{18}H_{37})_2]_2$ | 1,820 |
| 13 | R—(phenyl, with CH$_3$)—R; R = —NHCON($C_{12}H_{25}$)$_2$ | 1,950 |
| 14 | $OP[-NHCON(C_{12}H_{25})_2]_3$ | 1,960 |
| 15 | $OP[-NH-\overset{CH_3}{\underset{|}{CH}}-CH_2-O-oleoyl]_3$ [2] | 1,970 |
| 16 | $O_2N-N[-CH_2CH_2-NHCON(C_{12}H_{25})_2]_2$ | 1,985 |
| 17 | $[-(CH_2)_3-NHCON(C_{12}H_{25})_2]_2$ | 2,120 |
| 18 | Hydroxylated lecithin | 2,180 |
| 19 | $O_2N-N[-CH_2CH_2-NHCONH-\overset{CH_3}{\underset{|}{CH}}-CH_2-O-oleoyl]_2$ | 2,210 |
| 20 | $\left(\text{phenyl}-\overset{OCNH-C_{18}H_{37}}{\underset{|}{N}}-CH_2\right)_2$ | 2,290 |
| 21 | $P[-NHCON(C_{12}H_{25})_2]_3$ | 2,500 |
| 22 | R—(phenyl)—R, R; R = —CONH—$\overset{C_2H_5}{\underset{|}{CH}}$—CH$_2$—O—oleoyl | 2,520 |
| 23 | $O_2S[-CH_2-CH_2-NH-CH_2-CH_2-O-oleoyl]_2$ | 2,560 |
| 24 | $Si[-NHCON(C_{12}H_{25})_2]_4$ | 2,610 |
| 25 | Lecithin as received (57% solution in oil) | 2,950 |
| 26 | Twitchell Base 8240 | 22,800 |

[1] Oleyl designates $-(CH_2)_8-CH=CH-(CH_2)_7-CH_3$.

[2] Oleoyl designates $-CO-(CH_2)_7-CH=CH-(CH_2)_7-CH_3$.

Figure 1:
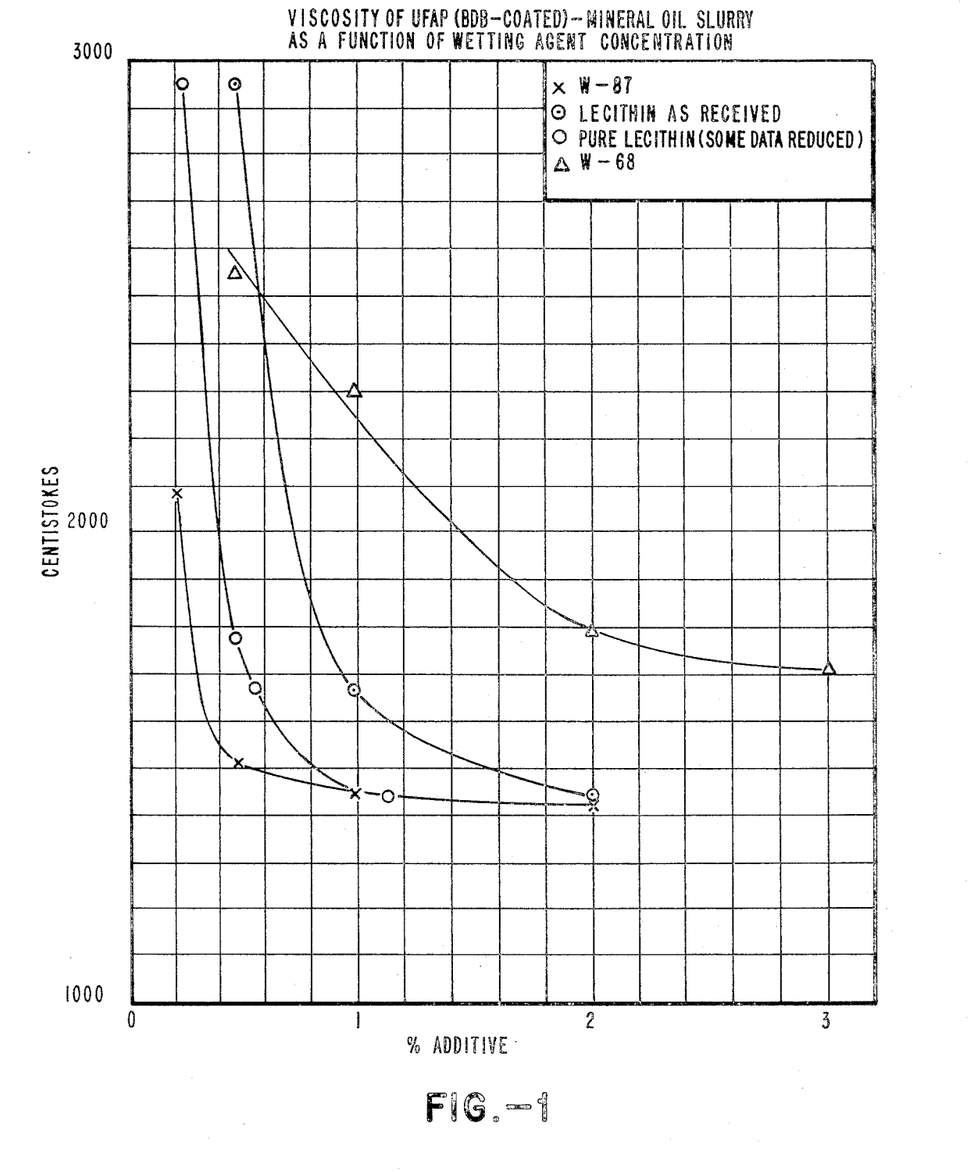

With the same system and method of dependence of viscosity on wetting agent concentration was measured. The data show (FIG. 1) that with the stronger wetting agents a minimum viscosity will be obtained within a rather small concentration range, which is the same for both wetting agents shown (lecithin and Compound No. 1 of Table II). The difference in their effectiveness shows up in the different concentrations, at which this level of minimum viscosity is reached. Weaker wetting agents (Compound No. 23 of Table II) do not only require higher concentrations for minimum viscosity, but apparently they also do not reach the same low level of viscosity obtained with stronger wetting agents. Further studies on such wetting agents revealed that they are not specific for BDB coated UFAP, but work as well with uncoated $NH_4ClO_4$. In fact, they are not even specific for $NH_4ClO_4$ or $NH_4^+$ salts. The viscosity of suspensions of powdered KCl or colloidal silica in mineral oil as shown in Table III is just as well reduced by them, and this seems to hold for all polar solids.

TABLE III.—VISCOSITIES OF A COLLOIDAL $SiO_2$ SLURRY IN MINERAL OIL* WITH 2% ADDITIVE

| Compound | Viscosity (centistokes) |
|---|---|
| #22 of Table II | 728. |
| #15 of Table II | 750. |
| Diethanolamide of oleic acid ("DEO") | 772. |
| #5 of Table II | 805. |
| Lecithin (3.5%, corresp. to 2% pure) | 816. |
| #3 of Table II | 850. |
| #4 of Table II | 853. |
| #1 of Table II | 853. |
| #7 of Table II | 874. |
| #13 of Table II | 887. |
| #6 of Table II | 894. |
| #19 of Table II | 925. |
| #14 of Table II | 968. |
| #2 of Table II | 974. |
| #17 of Table II | 1,063. |
| #12 of Table II | 1,104. |
| $OP(-NH-\overset{CH_3}{\underset{|}{C}H}-CH_2-OOC-CHOH-C_{13}H_{25})_3$ | 1,150. |
| #16 of Table II | 1,228. |
| #8 of Table II | 1,340. |
| #21 of Table II | Still thixotropic. |
| #24 of Table II | Do. |
| Hydroxylated lecithin | Do. |

*"Cabosil":mineral oil=8:100 b.w.; this mixture has a Vaseline-like consistency.

Most critical is the polarity of the dispersion medium, inasmuch as it requires a certain balance of the polar and unpolar part of the wetting agent, thereby narrowing the range of usable wetting agents. To put it it other words, these wetting agents are more specific in respect to the dispersion medium than in respect to the dispersed solids.

The binder systems considered for UFAP propellants consist mostly of polybutadiene prepolymers with functional terminal groups, such as carboxy-terminated polybutadiene (CTPB) and hydroxy-terminated polybutadiene (HTPB). Due to their higher viscosity, dispersions of UFAP in such prepolymers can no longer be measured with Oswald type viscometers and one has to switch to viscometers with rotating parts, such as the Brookfield. In case of thixotropic systems the yield value is easily reached in the immediate vicinity of the rotating spindle, but will spread out with time to more remote layers, so that a decrease of viscosity with time will be found. It is, therefore, more appropriate, to compare viscosity time curves than single viscosity data. Preferably spindle sizes and rpm's should be kept constant, unless correlation factors have been established for the particular system.

Figure 2:
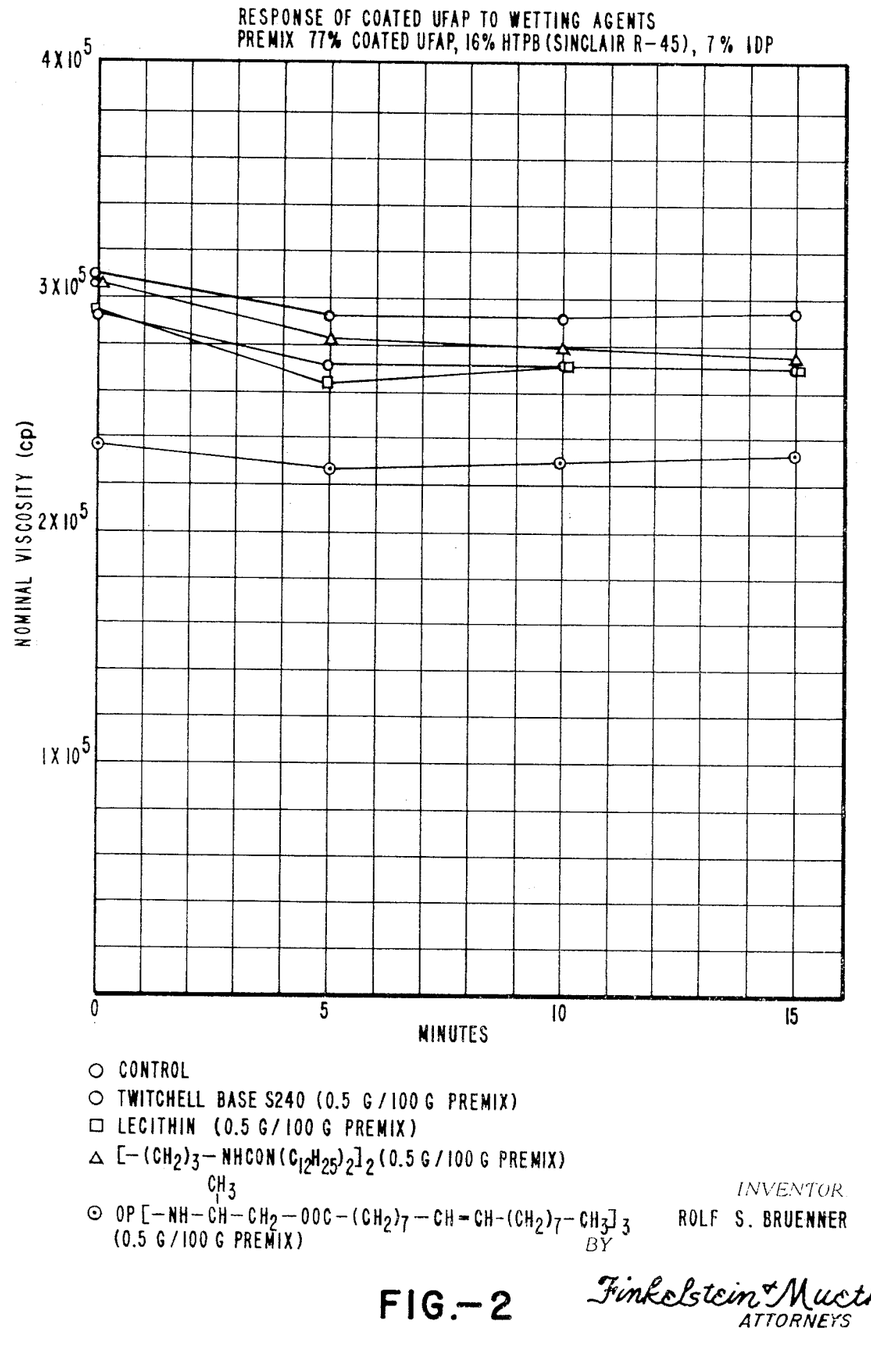

Under such conditions wetting agents have been tested in different binder systems. An example is shown in FIG. 2, where the test vehicle was a mixture of 77 percent coated UFAP, 16 percent hydroxy-terminated polybutadiene (HTPB) and 7 percent isodecyl pelargonate (IDP). The wetting agents were tested at a concentration of 0.5g/100g premix.

In this case the test system is not appreciably thixotropic as judged from the more or less horizontal viscosity-time curves. It is seen that the order of effectiveness has somewhat changed compared with that in the mineral oil-UFAP system (Table II).

A more accurate measurement of viscosities is achieved, if under equilibrium conditions the dependence of viscosity on shear stress is obtained as with the "Rotovisco" viscometer. Such measurements have been made with HTPB propellant and selected wetting agents. The composition of the propellant was as follows:

| | | |
|---|---|---|
| Solids: | 84% (oxidizer and metallic fuel) | |
| Binder: | 16% HTPB | 9.575% |
| | Isophorone diisocyanate (IPDI) | 0.925% |
| | Ballistic additive | 5% |
| | Wetting agent | 0.5% |

For wetting agents with functional groups, like DEO, the HTPB/IPDI ratio was adjusted correspondingly. Since the OH groups of the hydroxy-terminated polybutadiene are primary and its average functionality is about three, the curve reaction is relatively fast and increases of viscosity within one hour can be significant. For this reason propellant viscosities were measured 1.5 and 2.5 hours after curing agent addition. The results of these measurements are shown in FIGS. 3–10.

Figure 3:
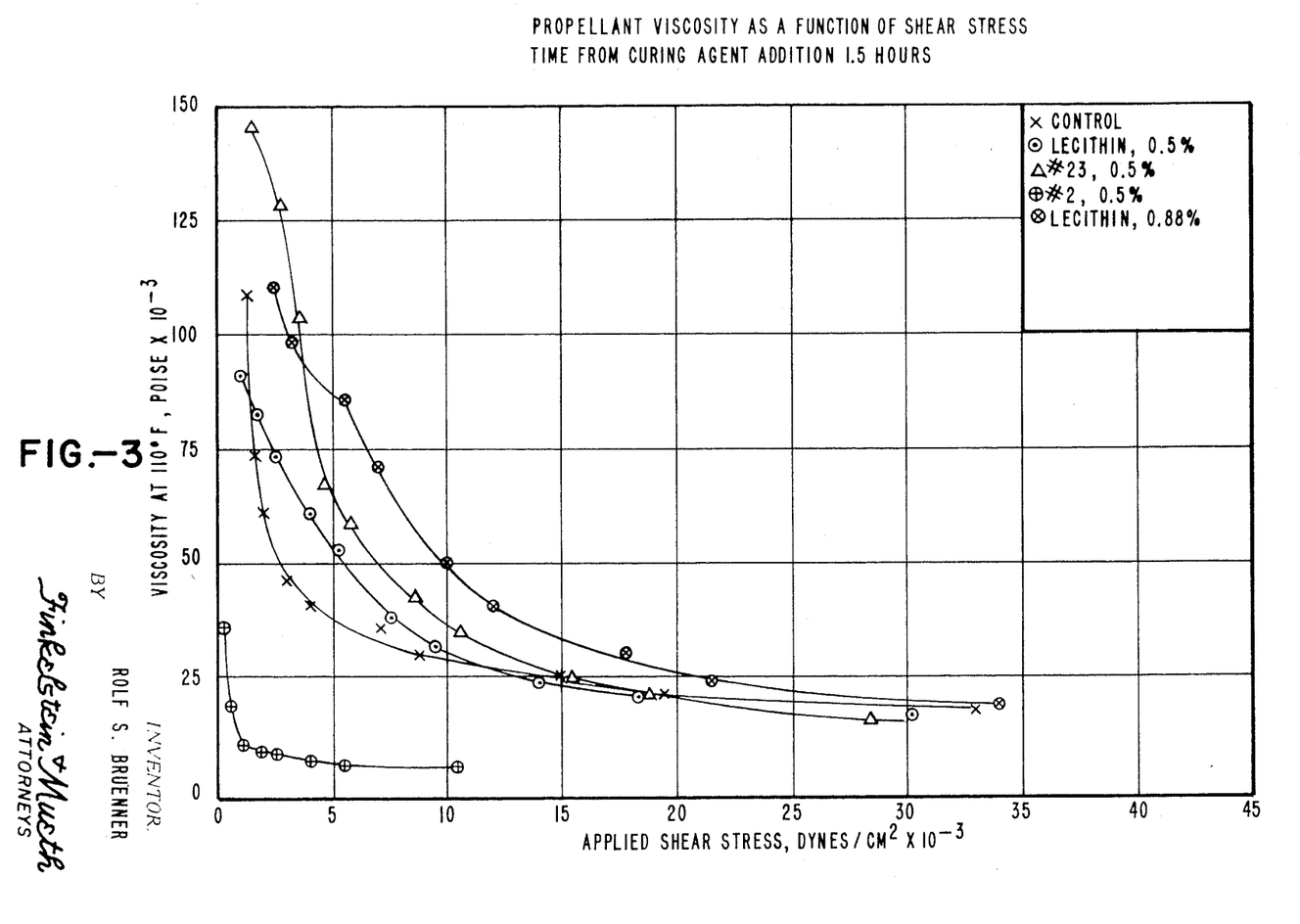
Figure 4:
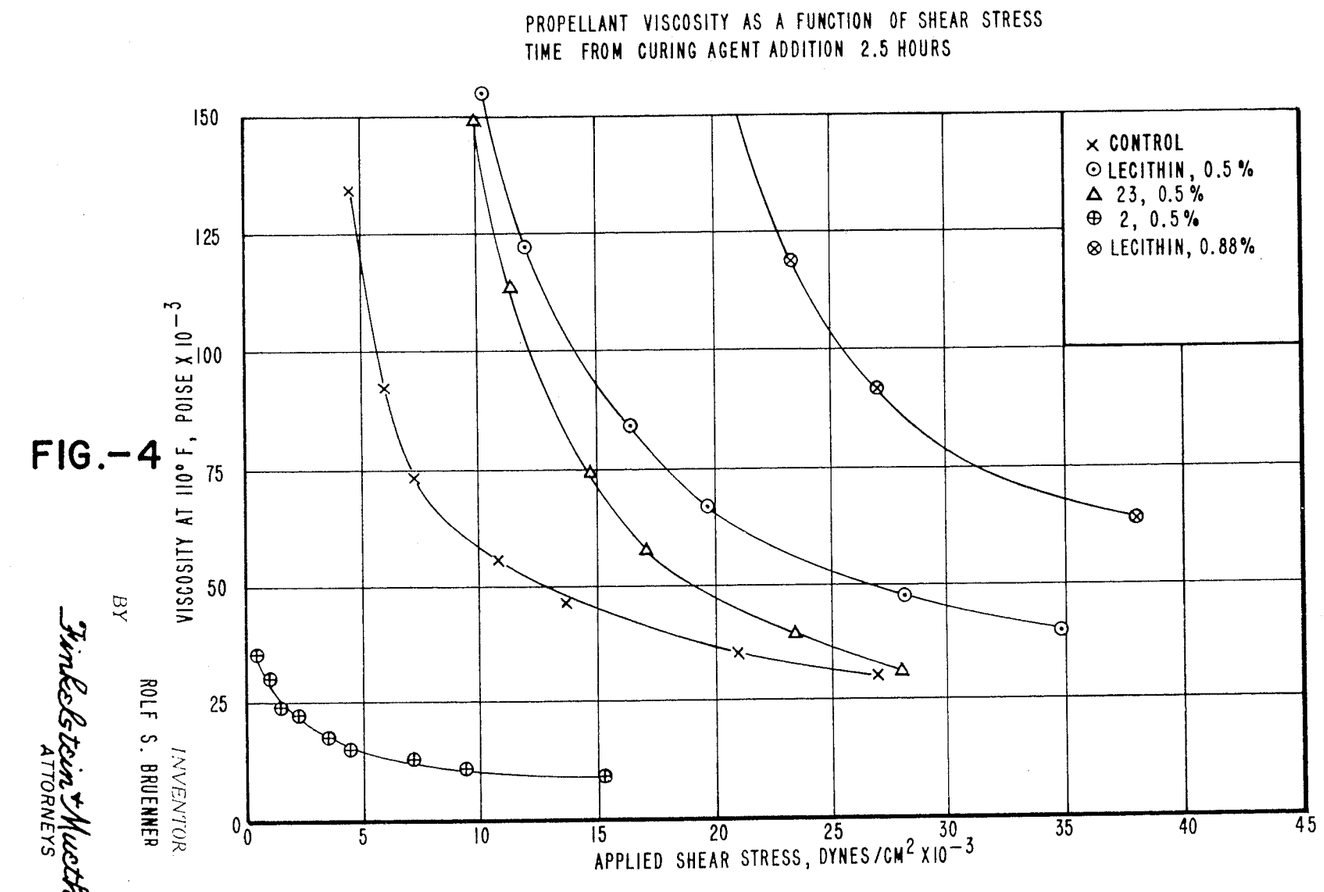
Figure 5:
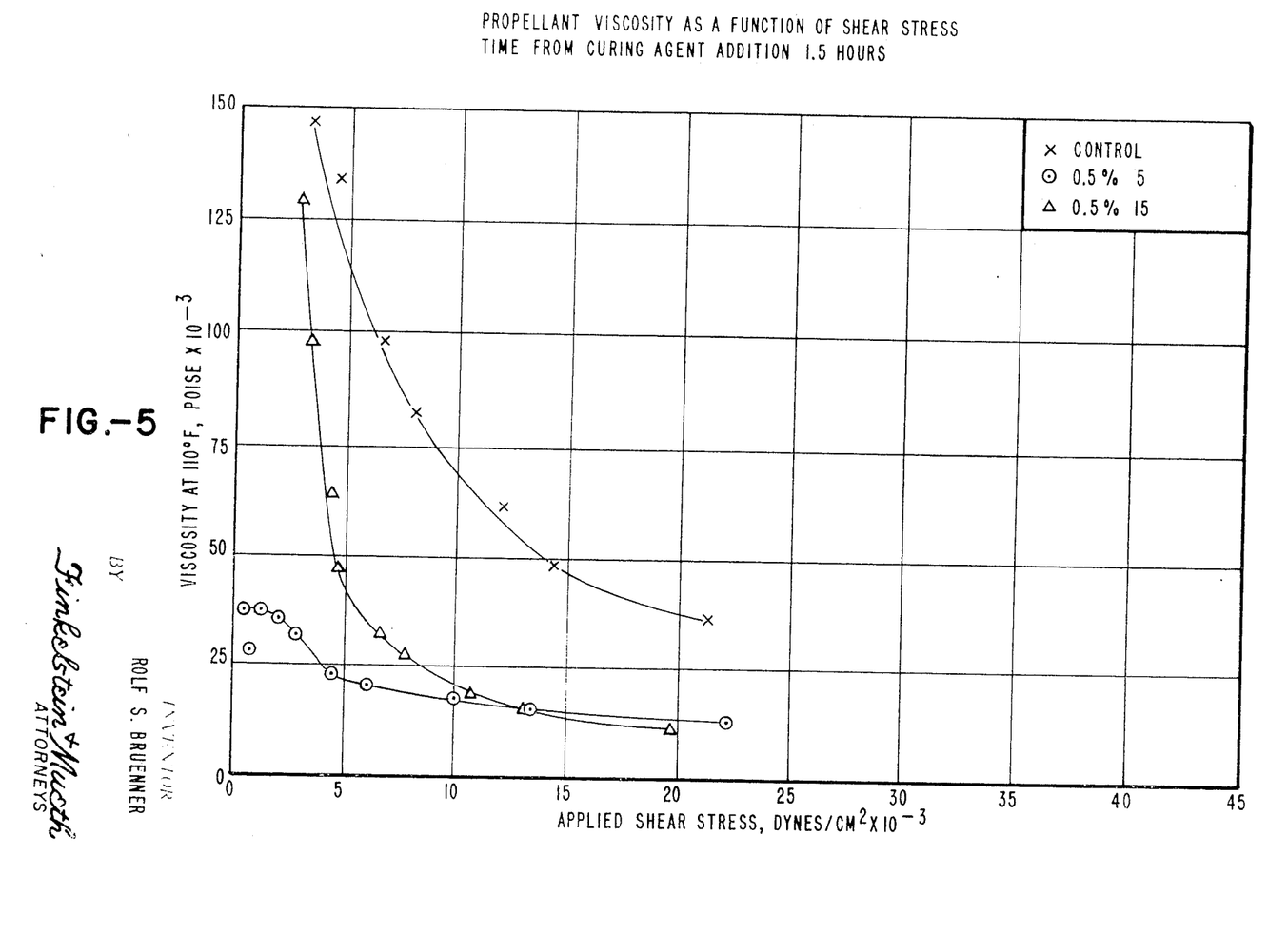
Figure 6:
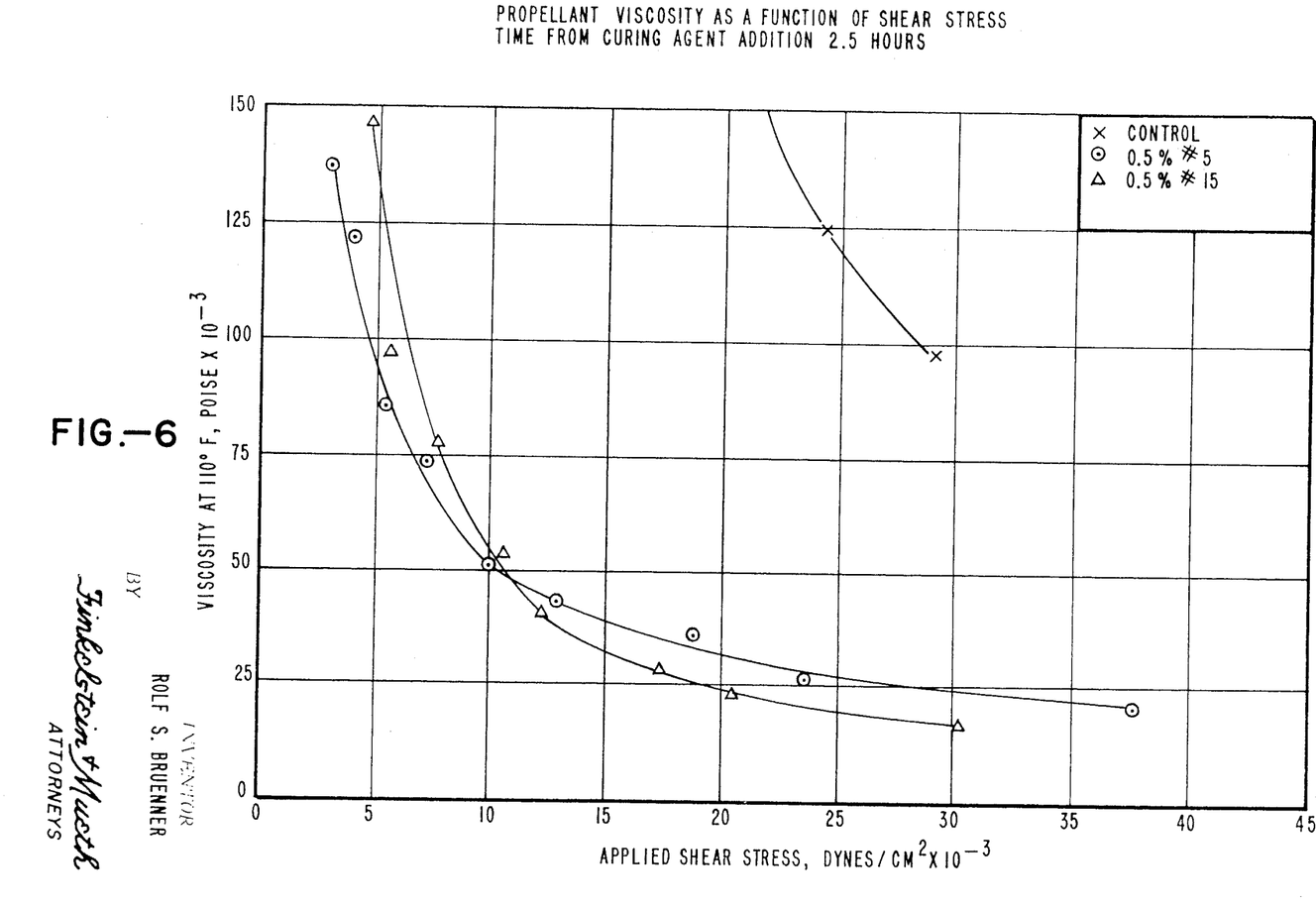
Figure 7:
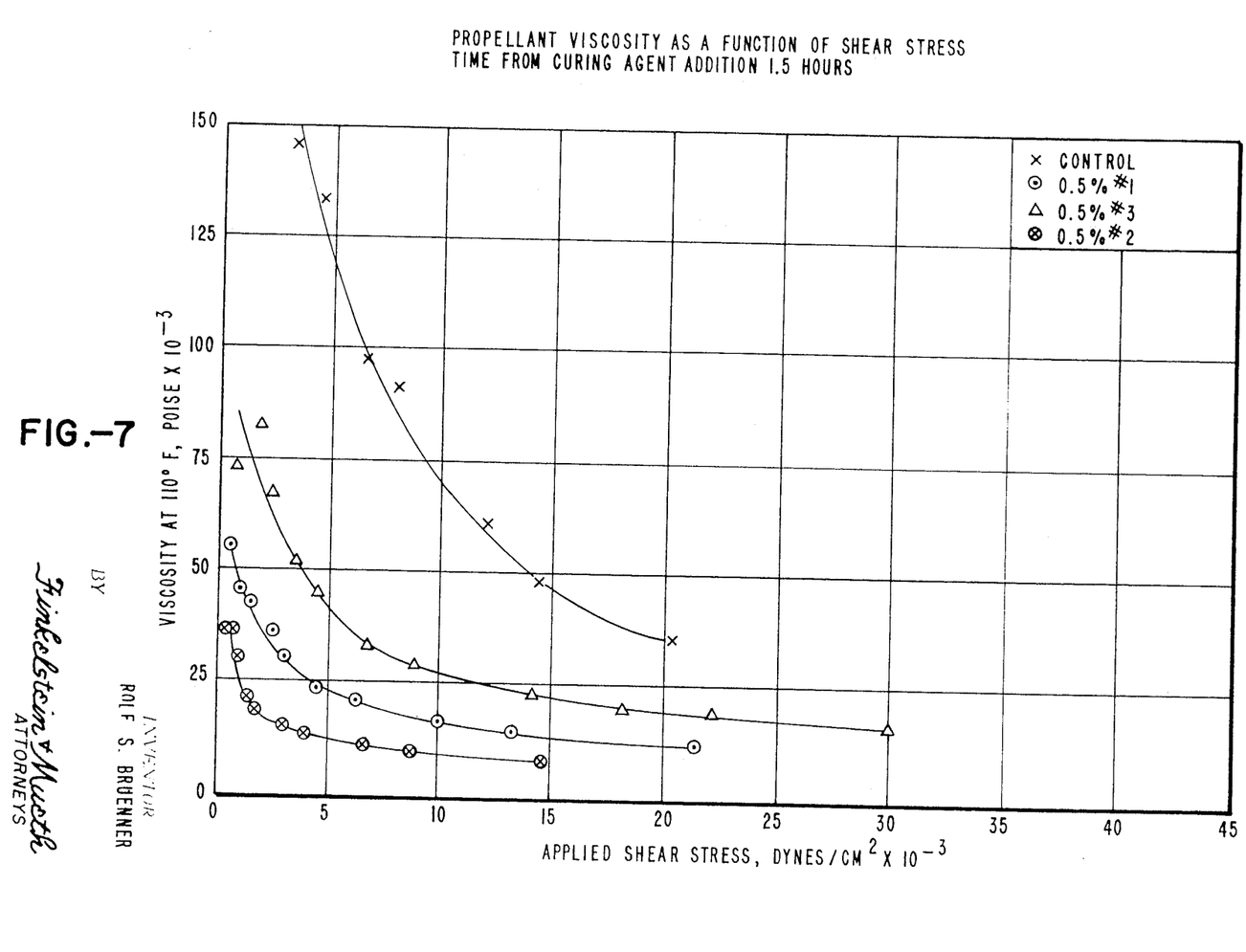
Figure 8:
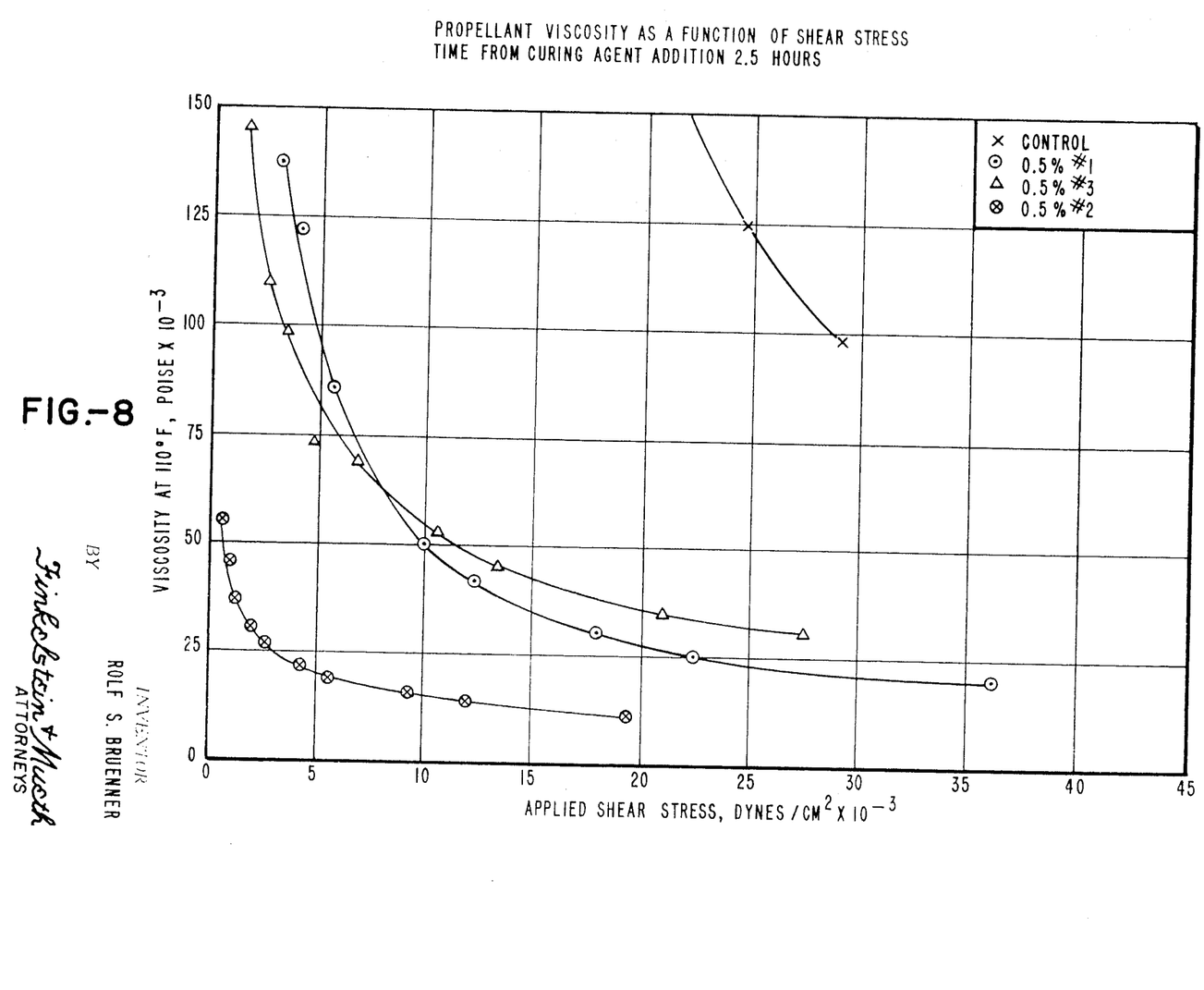
Figure 9:
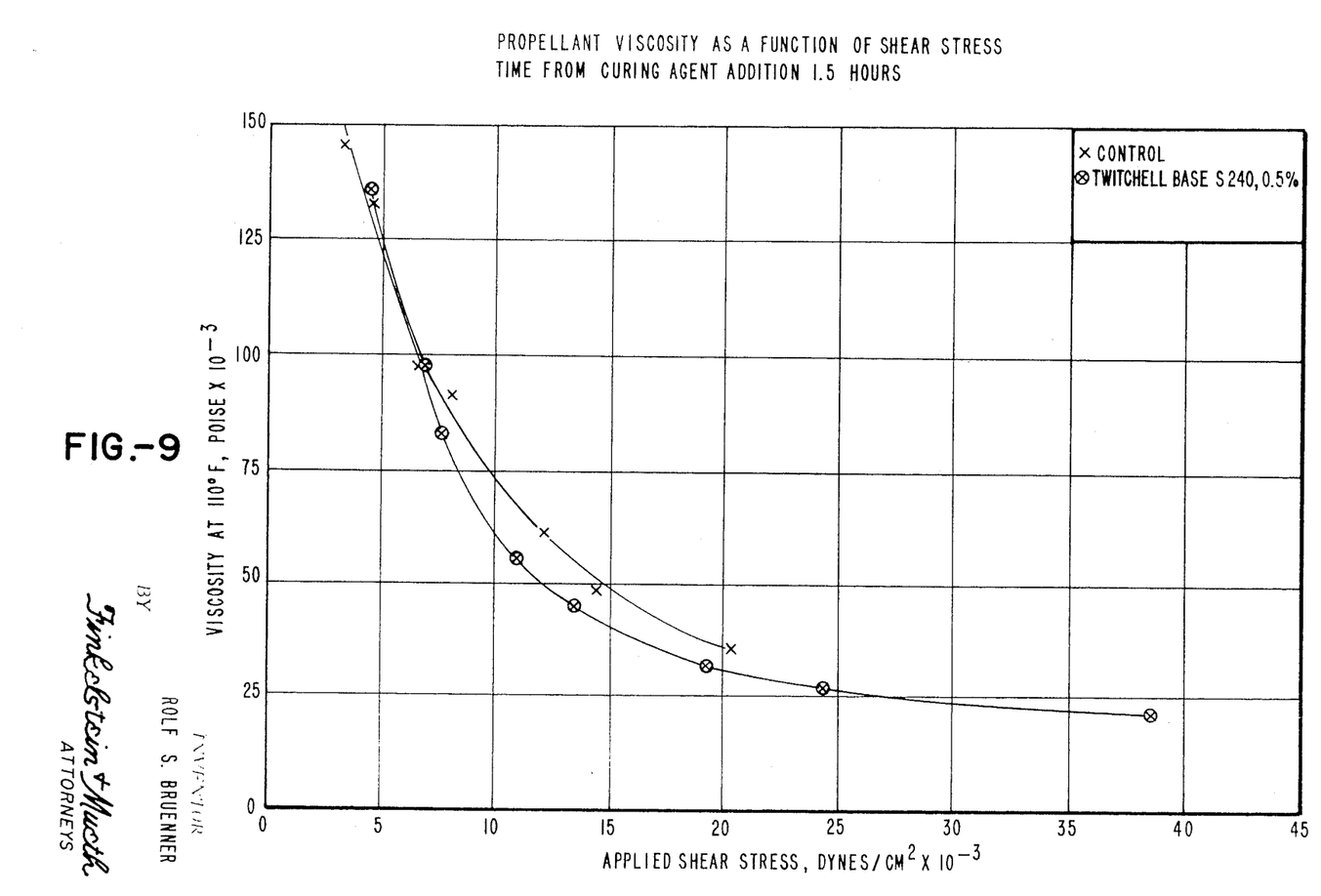
Figure 10:
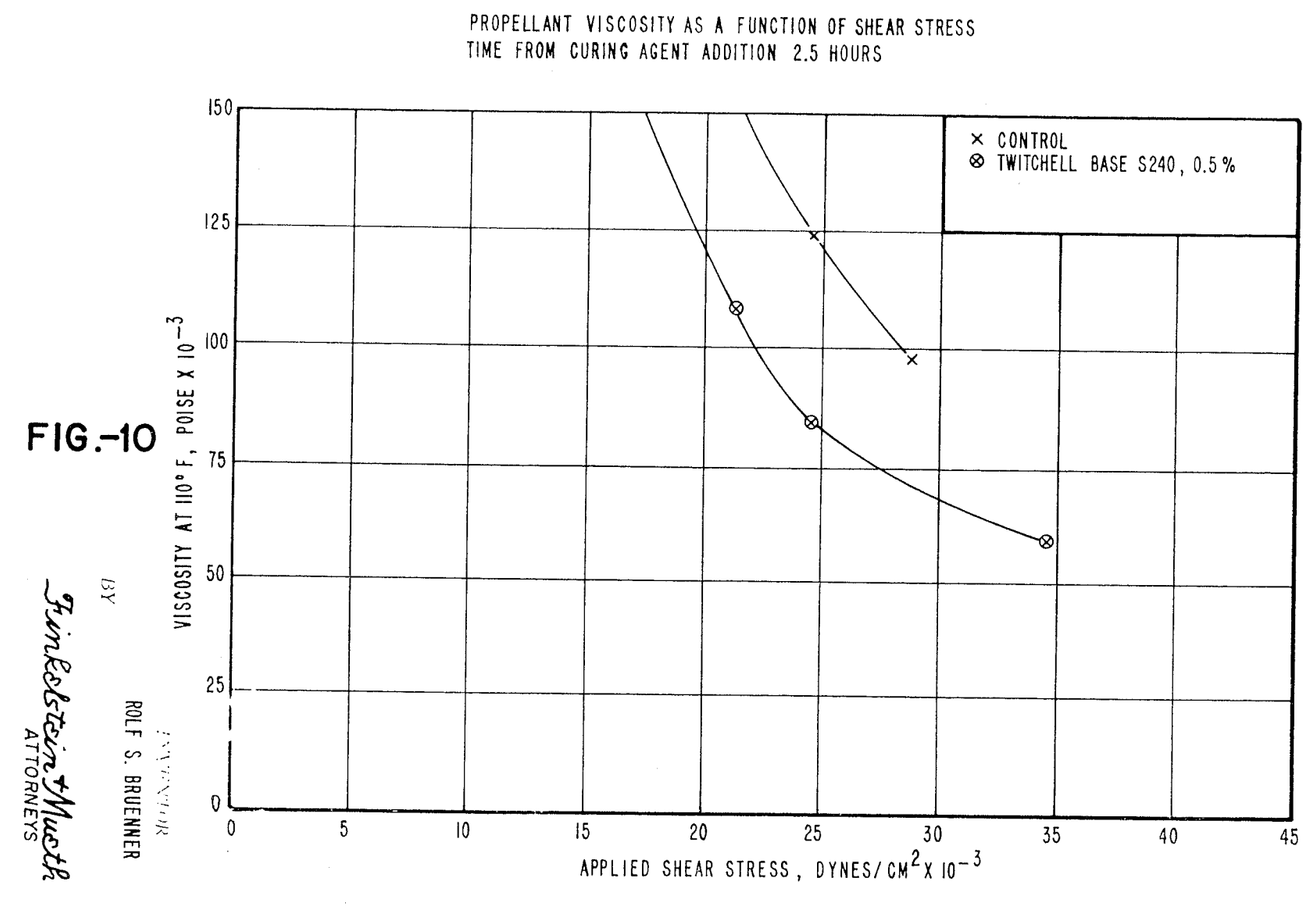
Figure 11:
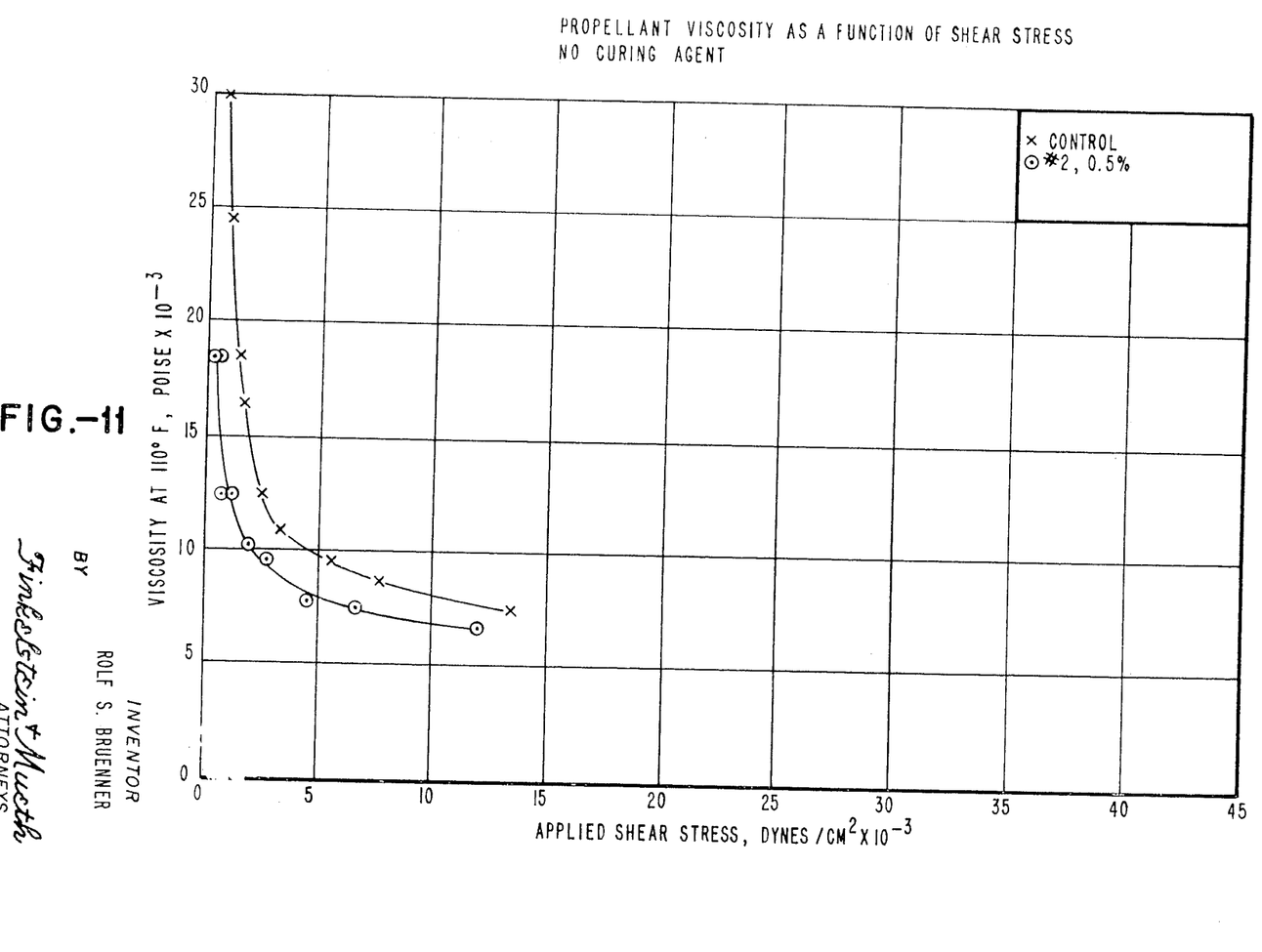

From FIGS. 3 and 4 it is at once obvious that lecithin apparently accelerated the cure reaction, which more than compensated its effect as a wetting agent. Very much the same situation is found with lecithine in an identical binder without any solids. As seen from FIGS. 3–10, very substantial decreases of propellant viscosity can be realized by some of the wetting agents tested. In one or the other case a certain deceleration of the cure reaction rate may also be involved, but all propellants cured to essentially the same hardness within a few days. That both phenomena may be operative is made likely by results with propellants, where the curative was held out (replaced by an equal volume of hydroxy-terminated polybutadiene) (see FIG. 11). There is still the effect of the wetting agents showing in the reduced viscosity over the control, but at the same time the viscosity of the control is considerably lower than that of a control with curvative (note that the scale in FIG. 11 is different from preceding figures).

The burning rate of a control propellant of above composition is about 5.3 in./sec at 2,000 psi and is not different within the accuracy of Crawford bomb solid strands burning rate measurements from propellants containing 0.5 percent of the wetting agents investigated.

From the data presented it can be seen that substituted bis- and poly-ureas, certain ureides, and aminoester derivatives, such as the respective amides, are very useful as processing aids.

PREPARATION OF WETTING AGENTS

All of the bis- and poly-ureas as well as ureides were prepared by the clean and quantitative addition reaction between isocyanate, and amines, which takes place almost instantaneously even at room temperature.

Equivalent amounts of isocyanate and amine were dissolved separately in dry benzene and the isocyanate solution added to the amine solution under stirring. The solvent was then evaporated at ambient pressure until the temperature of the residue reached about 100°C; the produce was stripped under vacuum. After this a sample of the product was either dissolved in or extracted with methanol and the pH of the methanolic solution checked, which is normally between 6 and 7 if all amine is used up. Recrystallization and distillation cannot be used in most cases for purification of the product; especially products derived from di-oleylamin or oleic acid are liquid or semi-liquid, but also most of the others are vaseline- to wax-like and cannot be characterized by a melting point. Since the addition reaction is practically quantative, purity of the reaction product depends only on the purity of the starting compounds.

Table IV contains all starting compounds for wetting agents of Tables II and III and the appearance of the reaction products, which were prepared according to above general method, except for the last four, which have been made by neat reaction of the starting compounds.

TABLE IV

| Number of compound as in Table II | Starting compounds for substituted ureas and ureides | | Appearance of reaction product |
|---|---|---|---|
| | Amine | Isocyanate | |
| 1 | [HN—(CH₂)₈—CH=CH—(CH₂)₇CH₃] ("Armeen 2-O"). | CH₂(—⟨C₆H₄⟩—NCO)₂ "Isonate 125M". | Viscous to semi-solid yellow-brown product. |
| 2 | do | OP(NCO)₃. | Yellow liquid of medium viscosity. |
| 3 | do | O₂N—H(CH₂—CH₂—NCO)₂ "XIII-Diisocyanate". | Yellow waxy solid. |
| 4 | do | OCN—⟨C₆H₃⟩—CH₃, NCO "TDI". | Amber-colored liquid of medium viscosity. |
| 5 | do | CH₂(—⟨C₆H₁₀⟩—NCO)₂ "Nacconate H-12". | Viscous, amber-colored liquid. |
| 7 | do | OCN—(CH₂)₆—NCO, "HDI". | Amber-colored semi-solid products. |
| 8 | do | [—⟨C₆H₃⟩—CH₃ NCO]₂ "Isonate 136T". | Buff colored waxy solid. |
| 10 | do | OCN—⟨C₆H₉⟩—NCO NCO "CTI". | Yellow, soft solid. |
| 6 | HN(C₁₈H₃₇)₂ ("Armeen 2HT"). | CH₃ OCN—CH₂—CH—CH₂—C(CH₃)₂—CH₂—CH₂—NCO "TMD-I". | White, waxy solid. |
| 9 | do | OCN—⟨C₆H₉⟩—NCO NCO "CTI". | Brittle white solid. |
| 12 | do | OCN—(CH₂)₆—NCO, "HDI". | White solid. |
| 13 | HN(C₁₂H₂₅)₂ ("Armeen 2C"). | CH₃ OCN—⟨C₆H₃⟩— NCO "TDI". | Viscous yellow liquid. |
| 14 | do | OP(NCO)₃. | Turbid liquid. |
| 16 | do | O₂N—N(CH₂—CH₂—NCO)₂ "XIII-Diisocyanate". | Light yellow, waxy solid. |

Table IV — Continued

| Number of compound as in Table II | Starting compounds for substituted ureas and ureides | | Appearance of reaction product |
|---|---|---|---|
| | Amine | Isocyanate | |
| 17 | do | $OCN\text{---}(CH_2)_6\text{---}NCO$, "HDI". | White, waxy solid. |
| 21 | do | $P(NCO)_3$ | Turbid liquid. |
| 24 | do | $Si(NCO)_4$ | Turbid liquid, slightly basic. |
| 20 | ⟨C₆H₄⟩—NH—CH₂—CH₂—NH—⟨C₆H₄⟩ | $H_{37}C_{18}NCO$ | Buff solid. |

| | Starting compounds for amido- and amino-esters* | | |
|---|---|---|---|
| | Aziridine derivative | Carboxylic acid | |
| 15 | $OP\left(-N\begin{smallmatrix}CH-CH_3\\CH_3\end{smallmatrix}\right)_3$ ("MAPO"). | Oleic acid | Amber-colored viscous liquid. |
| 19 | $O_2N\text{---}N\left(CH_2CH_2\text{---}NHCON\begin{smallmatrix}CH-CH_3\\CH_2\end{smallmatrix}\right)_2$ | do | Very viscous yellow liquid. |
| 22 |  R—⟨C₆H₄⟩—R, R=—$CON\begin{smallmatrix}CH-C_2H_5\\CH\end{smallmatrix}$ | do | Yellow, waxy solid. |
| 23 | $O_2S\text{---}(CH_2\text{---}CH_2\text{---}N\begin{smallmatrix}CH_2\\CH_2\end{smallmatrix})_2$ | do | Yellow, viscous liquid. |

*These materials have been made by neat reaction of equivalent amounts of the starting compounds listed.

The wetting agents of formulae I and IV are prepared in accordance with the procedure described in U.S. Pat. No. 3,184,301.

The wetting agents of formulae II and III are prepared in accordance with U.S. Pat. No. 2,915,480.

Having fully described the invention it is intended that it can be limited only by the lawful scope of the appended claims.

I claim:

1. Novel non-aqueous dispersions of polar solids in non-polar organic liquids containing a wetting agent which is:

wherein $R_1$ and $R_2$ are monovalent organic groups, $R_3$ is an aliphatic or aromatic hydrocarbon structure to which the ureido groups are attached, and $n$ is an integer of from 1 to about 4.

2. The dispersion comprising ultrafine particle of ammonium perchlorate in a hydroxy-terminated polybutadiene polymer containing a wetting agent which is:

$$R_1\diagdown_{R_2}N\text{---}\underset{\underset{O}{\|}}{C}\text{---}\underset{\underset{H}{|}}{N}\text{---}R_3\text{---}\left(\underset{\underset{H}{|}}{N}\text{---}\underset{\underset{O}{\|}}{C}\text{---}N\diagup^{R_1}_{R_2}\right)_n$$

wherein $R_1$ and $R_2$ are monovalent organic groups, $R_3$ is an aliphatic or aromatic hydrocarbon structure to which the ureido groups are attached, and $n$ is an integer of from 1 to about 4.

* * * * *